United States Patent [19]

Hansen

[11] 3,972,249

[45] Aug. 3, 1976

[54] MULTIPLE LEVER CONTROL CONSOLE

[75] Inventor: Kenneth N. Hansen, Waukesha, Wis.

[73] Assignee: Allis-Chalmers Corporation, Milwaukee, Wis.

[22] Filed: Aug. 11, 1975

[21] Appl. No.: 603,659

[52] U.S. Cl. .................................... 74/526; 74/523
[51] Int. Cl.[2] .......................................... G01P 3/00
[58] Field of Search .............................. 74/523, 526

[56] References Cited

UNITED STATES PATENTS 3,199,368 8/1965 Funk et al. ........................... 74/526
3,492,889 2/1970 Hauff ................................... 74/523

*Primary Examiner*—Henry T. Klinksiek
*Attorney, Agent, or Firm*—Arthur L. Nelson

[57] ABSTRACT

A control console having multiple levers rotating on a common axis with each of the levers including an arcuate segment alternately positioned between the spacers on an axial supporting structure aligned within the console housing. A lever handle extends from the arcuate segment of each lever for operating the lever with connecting means from operating a controlled mechanism. Stops and detents are provided by the arcuate segment.

10 Claims, 15 Drawing Figures

MULTIPLE LEVER CONTROL CONSOLE

This invention relates to controls for a tractor and more particularly to the control console having multiple levers rotating on a common axis. Each of the levers includes a handle and an arcuate segment rotated on a pivotal axis. The arcuate segment and spacers are alternately spaced in the console which maintain a closed top of the control console as the lever is pivoted for the aft. The arcuate segment also controls the movement of the lever by including stops and detent mechanisms associated with the lever. A suitable linkage connects the control lever with the control mechanism in the tractor.

The control console of the modern tractor usually includes a plurality of levers. The mounting of each lever individually on a bearing with a handle to operate the lever and suitable guide means, stops, detents and connecting linkages for operating a servomechanism requires considerable space, particularly when a number of levers are mounted in this manner. Accordingly, this invention provides a control console in which a plurality of levers are mounted in a cluster. The levers rotate on a common axis and are maintained in their rotatable operating position by spacers pressing against the side of an arcuate portion of each lever since the bearing portion of the lever is not wide enough to provide adequate bearing and aligning surfaces per se. The spacers maintain an axial alignment and a purely rotational movement of the lever during its operation. Each lever handle is connected to a mating arcuate portion with the handles of each lever in diverging relationship to the handle of the adjacent lever. The control console consists of a plurality of like spacers and like arcuate sections which are easily positioned in the control console and the number of levers used in the combination may be easily increased or decreased depending on the requirement of the tractor. The means for control of lever movement such as stops to limit the degree of rotational movement of the lever, or detents to maintain the lever in its stopped position, or a friction device for retarding movement of the lever are all provided on the arcuate portion of the lever. In this manner the functioning of the lever is controlled within the control console and the spacers as well as the arcuate segments maintain a closed upper portion of the control console to maintain a clean operating condition within the housing to assure reliability of the control mechanism.

It is an object of this invention to provide a control console for a cluster of levers for convenient operation of the tractor and related functions of the implement.

It is another object of this invention to provide a control console with a cluster of levers whereby each lever includes an arcuate segment pivotally supported on a common axis with spacers to maintain the axial alignment of the levers and a purely rotational movement of the lever by engaging the arcuate segment at the center rotation and also at points spaced radially from the rotational axis to assure reliable operation of the levers. It is a further object of this invention to provide a control console with a cluster of levers alternately spaced with spacers mounted on a common axis of support carried by the console housing whereby the levers have an arcuate segment engaging the spacers formed by a hub and rim to maintain a closed control console to prevent water and foreign materials from entering the control console to assure reliability for the operating mechanism in the control console.

It is a further object of this invention to provide a cluster of levers in a control console whereby each lever includes an arcuate section pivotally mounted on a pivotal support axis and spacers positioned between each of the levers whereby each spacer has a hub and spokes extending to a rim section which maintains the alignment of the levers as the lever and spacers are aligned within a control console housing.

The objects of this invention are accomplished by providing a control console with a plurality of levers and spacers positioned on a supporting axis. The spacers consist of a hub section and a rim section which bear against the lateral portion of the arcuate section of each lever. The spacers are lightly pressed against the arcuate section to maintain an aligned position of the lever on its pivotal axis and maintain a purely rotational movement of the lever. The arcuate section also includes slots and suitable mechanisms to limit the rotational movement of the lever, to provide a detent to retain a predetermined position of the lever, and a frictional braking means to permit infinite positioning of a lever in its rotational path of movement. The rim section of the spacers and the arcuate section of the lever close the upper side of the control console to prevent dirt, water and other such foreign material from entering the control console which may reduce the reliability of operation of the levers.

The preferred embodiments of this invention are illustrated in the attached drawings.

Figure 1:
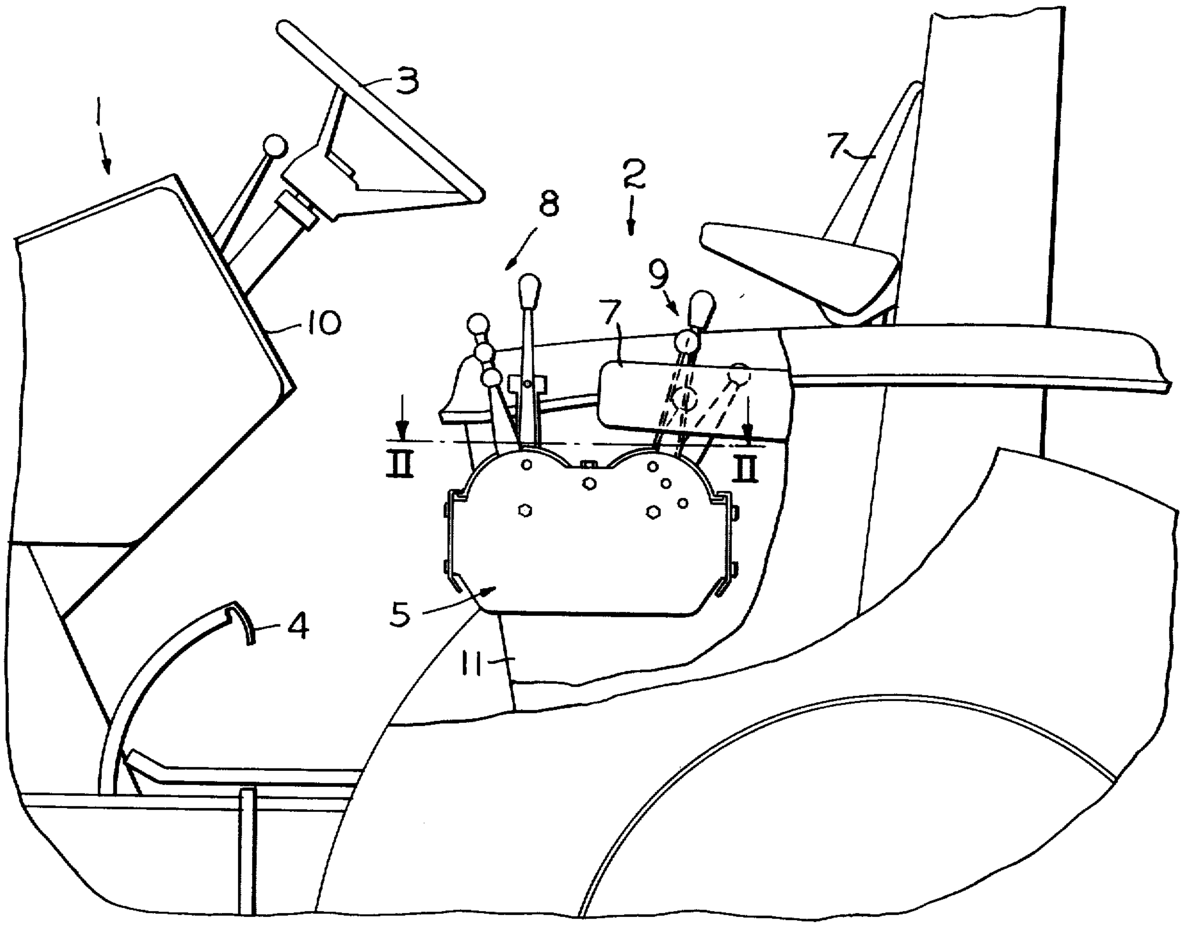
FIG. 1 illustrates the control console mounted at the operator station of a tractor.

Referring to FIG. 1, a tractor 1 is shown with an operator station 2. The operator station 2 is generally defined by the steering wheel 3, the foot pedal 4, the control console 5 and the seat 7. The control console is positioned on the right side of the seat with a portion of the tractor broken away to illustrate the mounting of the control console. The control console includes a cluster of levers 8 mounted forwardly in the control console and a cluster of levers 9 positioned rearwardly in the control console. The steering wheel 3 is mounted on the dashboard 10 and the steering column extends downwardly into the tractor as shown.

Figure 2:
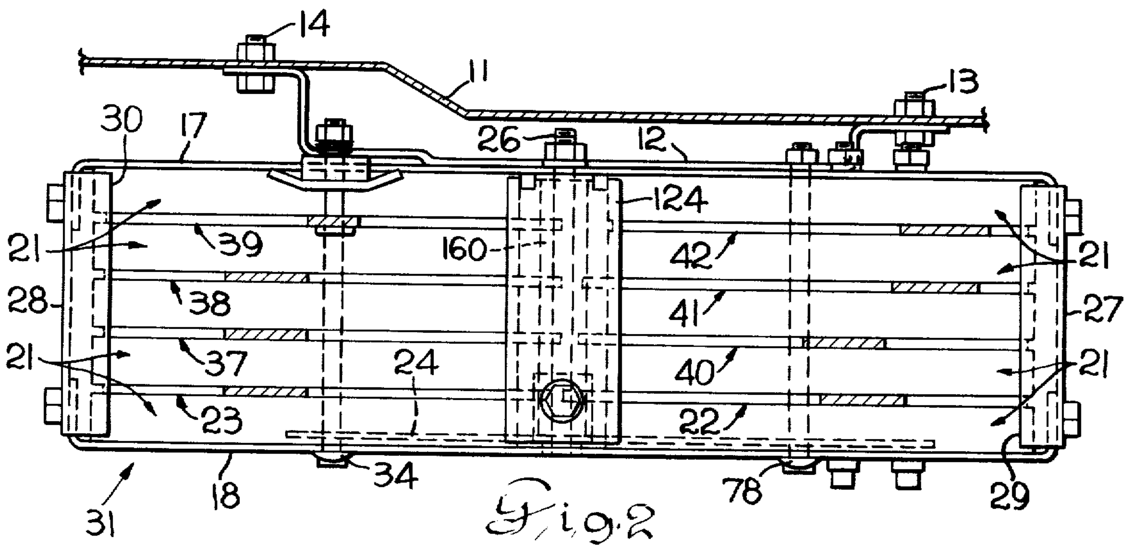
FIG. 2 is a plan view partially in section to show the mounting of the control console on the tractor.
Figures 3, 4:
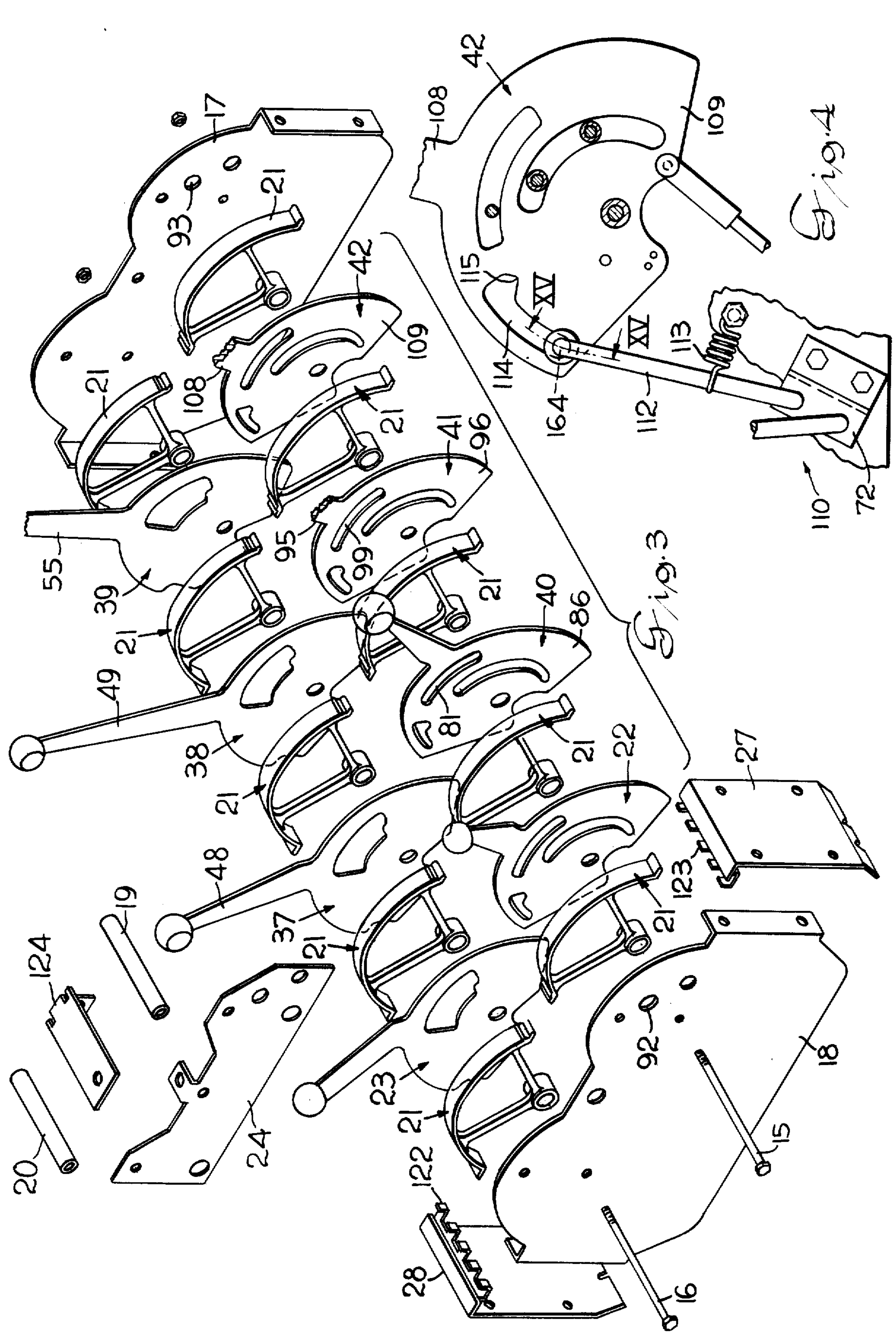
FIG. 3 is an exploded view of the control console shown in FIGS. 1 and 2.
FIG. 4 is a partial section view of a control lever and detent mechanism and also a linkage for connection to the controlled mechanism.
Figure 12:
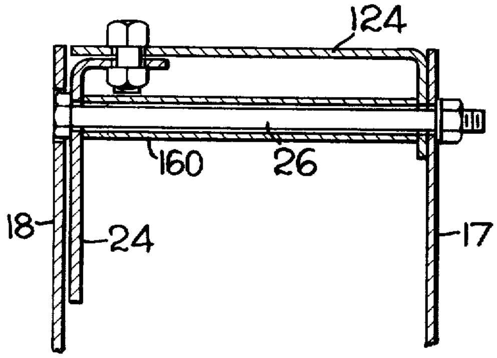
FIG. 12 is a section view taken on line XII—XII of FIG. 6.

FIG. 2 illustrates a section taken on line II—II of FIG. 1. It shows fender 11 carrying the bracket 12 by means of the bolts 13 and 14 fastened to the fender 11. Control console 5 is fastened to the bracket 12 by means of the bolts 15 and 16. FIG. 3 illustrates an exploded view of the control console showing the housing, levers and spacers and their relative positions in relation to each other. Side plate 17 and side plate 18 provide support for the bolts 15 and 16. The bolts 15 and 16 extend through the side plates 17 and 18 and also through the bushings 19 and 20, respectively. The bushings 19 and 20 form a supporting means for supporting the plurality of spacers 21 and also pivotally support the levers 22, 40, 41 and 42 and also 23, 37, 38 and 39. A reinforcement bracket 24 is positioned immediately inside the side plate 18 which reinforces the support of the side plate 18 for supporting the bolts 15 and 16 as well as providing a support for the center plate 124 which extends centrally between the clusters of levers and is fastened by bolts on either end to the side plate 18 and side plate 17, respectively. FIG. 12 shows sleeve 160 on bolt 26 holding the side plates 17 and 18 in spaced relation to each other.

FIG. 2 shows a bolt 34 passing through the left-hand side of the console housing and the bolt 78 passing the right-hand of the console housing. The side plates 17 and 18 and the end plates 27 and 28, as well as the center plate 124, form the housing for the control console 5. As viewed in FIG. 2, two openings, 29 and 30, are formed in the top of the housing 31. A cluster of levers 22, 40, 41 and 42 and spacers 21 close the opening 29. The cluster of levers 23, 37, 38 and 39 and spacers 21 close the opening 30 when the control console is assembled. Bolts 15, 16, 78 and 34 are tightened to form engagement between the spacers 21 and levers 22, 40, 41 and 42 and also 23, 37, 38 and 39 to permit movement of the levers and yet maintain a closed assembly on the top side of the control console.

Figure 8:
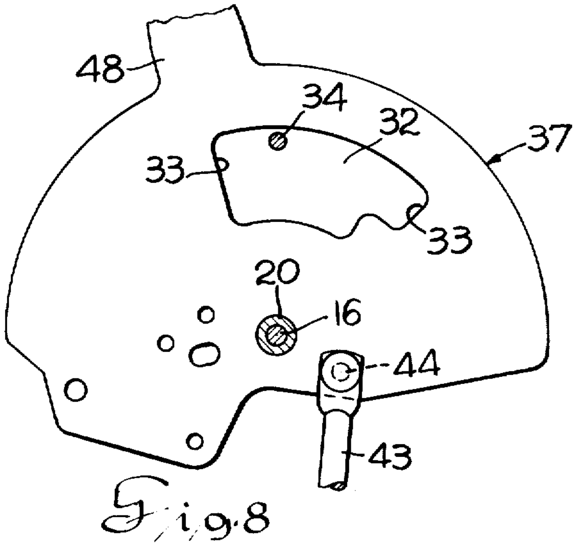
FIG. 8 is a section view taken on line VIII—VIII of FIG. 5.

FIG. 8 illustrates lever 37 having an arcuate slot 32. The upper portion of the slot 32 forms abutting surfaces 33 which engage the bolt 34 to limit pivotal movement of lever 37 in the clockwise and counterclockwise directions as viewed in FIG. 6.

The lever 37 is mounted on the sleeve 20, carried on the bolt 16. The link 43 is pivotally connected by the pin 44 to operate a servomechanism. The handle 48 operates the lever to pivot about its pivotal axis.

Figure 9:
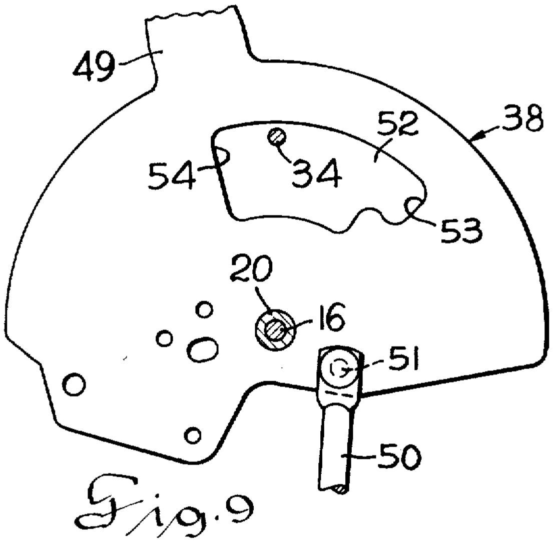
FIG. 9 is a section view taken on line IX—IX of FIG. 5.

Referring to FIG. 9, the lever 38 is also provided for pivotal rotation about the bolt 16 and sleeve 20. The handle 49 operates the lever and the link 50 is pivotally connected by means of a pin 51 for operating a servomechanism. The slot 52 has abutting surfaces 53 and 54 which engage the bolt 34 when lever 38 is pivoted to its extreme positions.

Figures 5, 6, 7:
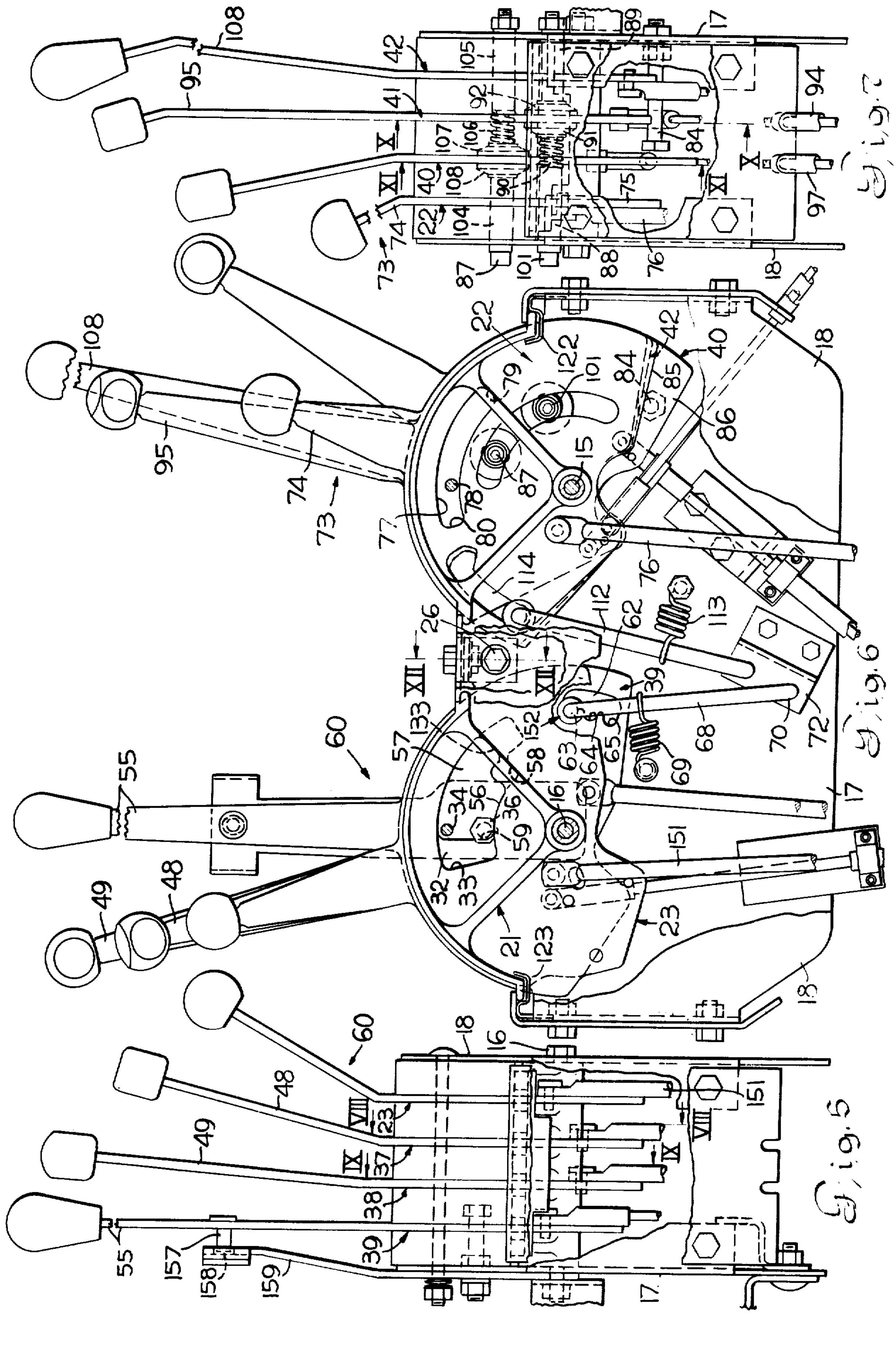
FIG. 5 is an end view of the control console with a portion broken away to show the related positions of the components in the control console.
FIG. 6 is a side elevation view with a portion of the side panel broken away to show the relative position of the components in the control console.
FIG. 7 is the opposite end view of the control console with a portion of the end panel broken away to show the relative positions of the components in the control console.

The transmission shift lever 39 includes a handle 55 which pivots the lever about the bolt 16 and sleeve 20. Bolt 36 extends through the lower portion 56 of the slot 57 and engages the abutting surfaces 58 and 59 to limit the pivotal movement of lever 39 in the clockwise and counterclockwise directions. A detent mechanism is shown in FIGS. 5 and 6. When the lever is positioned in its neutral position, the detent pin 157 is allowed to move into the recess 158 by the resilience of the handle 55 and detent support 159. The detent support 159 is formed with ramp surfaces on either side of the recess 158.

An additional detent mechanism is provided on a transmission shift lever 39 as disclosed in the cluster of levers 60. This detent mechanism is shown in FIG. 6. The slot 62 is formed with recesses 63, 64 and 65. The shift lever positions are defined by the recesses 63, 64 and 65 as the end of the arm 68 is selectively seated. The spring 69 causes the arm to pivot. The end 70 pivots on bracket 72 and the bushing 152 seats in one of the recesses.

The cluster of levers 73 is shown to the rear of the lever cluster 60. The rear lever cluster includes shift lever 22, 40, 41 and 42. Lever 22 is formed with the handle portion 74 which extends from the arcuate segment 75. The arcuate segment 75 is pivotally supported on the sleeve 19 which is carried on bolt 15. The arcuate segment is connected to the link 76 which is adapted for operating a servomechanism.

The arcuate section 75 defines a slot 77 which receives the bolt 78 which extends through the control console 5. The slot 77 forms abutments 79 and 80 which limit the counterclockwise and clockwise rotation of the lever 22.

Figure 10:
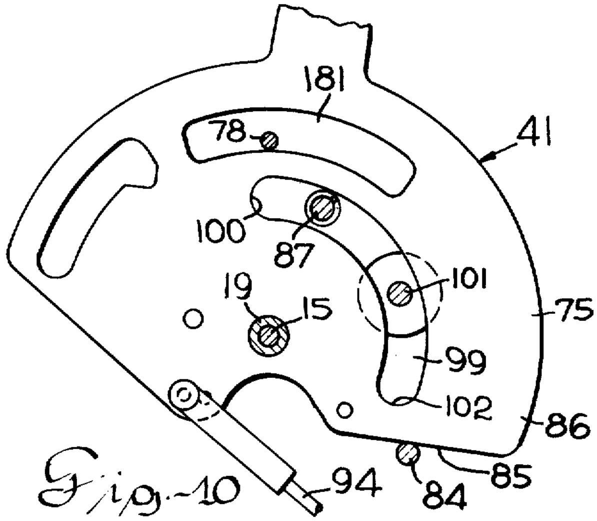
FIG. 10 is a section view taken on line X—X of FIG. 7.

The lever 41 is shown in FIG. 10 with bolt 78 extending through the slot 181. An additional stop is shown comprising the bolt 84 which extends to the side plate 17 and engages the end surface 85 of the arcuate segment 86.

The bolt 87 carries the sleeves 104 and 105 which compress the spring 106 against the friction washers 107 and 108. The sleeves 104 and 105 are received in the holes 92 and 93, respectively. The sleeve 104 and 105 and bolt 87 are free to move axially in the holes 92 and 93 with the friction washers 104 and 105 engaging the sides of the arcuate segment. Arcuate segment 86 controls the axial position of the bolt since the bolt is free to float axially. The arcuate segment 86 is connected to the sheath cable 94 to operate the servomechanism.

Figure 11:
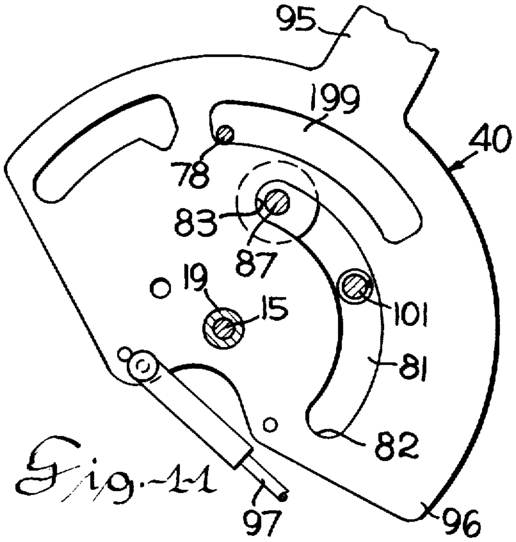
FIG. 11 is a section view taken on line XI—XI of FIG. 7.

FIG. 11 illustrates the lever 40 with the handle portion 95 connected to the arcuate segment 96. a suitable servomechanism is connected to the sheathed cable 97 which is pivotally connected to the arcuate segment 96. Bolt 78 extends through the slot 99. Bolt 87 limits the clockwise rotational movement of the lever 40 as it engages the abutting surface 83 when the lever is rotated. Similarly, the bolt 101 limits the movement of the lever 40 in the counterclockwise direction as it engages the abutting surface 82 of slot 81. The bolt 101 carries the sleeves 88 and 89. The sleeves 88 and 89 compress the spring 90 against the friction washers 88 and 89. Friction washers engage the arcuate segment 96 of the lever 40 and provides infinite positioning of the lever 40 in its operation.

FIG. 4 shows lever 42 with the handle portion 108 and arcuate segment 109. Lever 42 controls power takeoff operation of the tractor. Power takeoff assembly detent mechanism 110 includes bracket 72 pivotally supporting the rod 112. The spring 113 biases the rod against the end surface in the slot 114. The recess 115 receives the end of the rod 112 in its detent position when the power takeoff is in operation.

Figure 13:
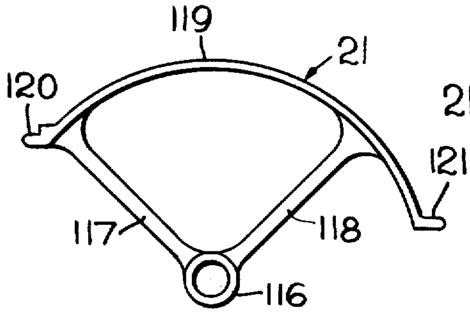
FIG. 13 is a side view of one of the common spacers used in the control console.
Figure 14:
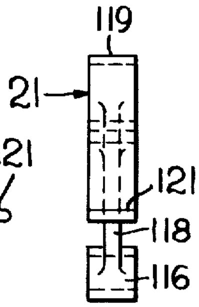
FIG. 14 is an end view of the common spacer used in the control console.
Figure 15:
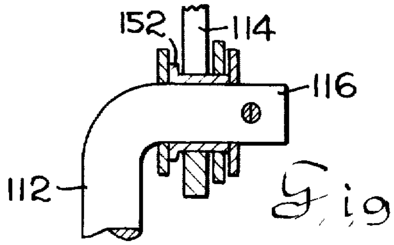
FIG. 15 is a section view taken of line XV—XV of FIG. 4.

The spacer 21 is shown in FIGS. 13 and 14. The spacer comprises a hub 116 connected through radial spokes 117 and 118 to the integral rim portion 119. The flanges 122 and 123 are formed on the end plates 27 and 28.

The flanges 122 and 123 are positioned under the flanges 120 and 121 of the spacer 21 in the assembled position.

The operation of this device will be described in the following paragraphs.

The front cluster of levers 60 are shown in the left-hand side of FIG. 6 and in FIG. 5. The lever 23 and the levers 37 and 38 are adapted to operate valves for hydraulic cylinders which are remote from the control console. Lever 23 is connected by link 151 which in turn is connected to a suitable linkage to operate a control valve for controlling a hydraulic actuator. Similar linkages are provided with the lever 37 and the lever 38 as well. As lever 23 is moved to its extreme forward position, the bolt 34 engages an abutment 33 and stops the lever from counterclockwise rotation. In this position, the hydraulic actuator is in operation. As the lever 23 is rotated in a clockwise direction as viewed in FIG. 6, the hydraulic actuator is inoperative. The stop formed by the abutment 33 in the slot 32 engages the bolt 34 to stop the lever from further rotation movement.

The shift lever 39 is shown with a detent mechanism 152. The detent mechanism includes the bracket 72 supporting the link 68 which extends upwardly and forms an arm extending through the slot 62. The slot 62 is formed with recesses 63, 64, and 65. The lever 39 can be moved to one of three positions. A first operating position is shown when the bushing 152 on the pin arm is in recess 63. The neutral position is when the bushing on The pin arm is in the recess 64 and the second operating position when the bushing on the pin arm is in the recess 65. The spring 69 connected to the link 68 holds the lever 39 in one of the three positions. A two position arrangement is also shown whereby the bolt 36 extends into the lower slot 56. The abutments 58 and 59 form the off/on positions respectively as the bolt 36 engages abutments 58 and 59.

A detent mechanism is also shown in FIG. 4. The arm of rod 112 drops in the recess 115 and due to the resilience of the spring 113, the lever is held in the neutral position.

Referring to the right-hand portion console shown in FIGS. 6 and 7, the rear cluster of levers 73 is shown. The lever 22 is adapted for operating a remote hydraulic cylinder through a control valve. A control valve is normally connected to the link 76 through a suitable linkage. The control valve is connected hydraulically to a hydraulic actuator to operate a servomechanism. The control lever 22 forms a slot 77 which limits forward and rearward rotational movement of lever 22. As the lever 22 moves forward, it engages the abutment 79 and the hydraulic valve is then open and the hydraulic actuator is operative. When the control lever 22 is rotated counterclockwise to its extreme position, the abutting surface 80 engages the bolt 78 and the control lever is in its inoperative position.

The lever 40 is a control lever for operating a hydraulic weight distribution system. The lever is connected by means of sheathed cable 97 to a suitable linkage in the control valve mechanism for the hydraulic weight distribution system. When the lever is moved to its rearward clockwise rotated position, the bolt 87 engages the forward end 83 of the slot 81 and the hydraulic weight distribution system is no longer operated in response to draft loads on the lower draft arms of a three-point hitch. When the lever 40 is rotated in the counterclockwise direction, the friction washers 107, 108 on bolt 87 frictionally engage the sides of the lever and it may be positioned in an infinite number of positions and held in this position by friction of the friction washers 107, 108. It can be positioned in the extreme forward position which allows the lower draft arms to lower the implement and operate in the draft load control position.

Lever 41 is a lever adapted for controlling the position of the implement in a predetermined position depending on the position of lever 41. When the lever 41 is rotated to its extreme rearward position, the abutting surface 85 engages the bolt 84 and the hydraulic weight distribution system is positioned in the off position. When the lever 41 is rotated forward, the friction washers 91 and 92 on bolt 101 engaging the lateral surfaces of the lever 41 provide for infinite positioning of the lever for an infinite number of positions for the implement.

The lever 41 can be positioned completely forward in which the bolt 101 engages the abutting surface 102 of slot 99 and the position of the implement is in its lowest position. The sheathed cable 94 is connected to a suitable linkage which in turn is connected to the control valve of the hydraulic weight distribution system which automatically positions the upper link and lower draft arms and the position of the implement is automatically controlled through the hydraulic actuators connected to the rock shaft of hydraulic weight distribution system.

The lever 42 is a power takeoff control lever. This lever has the positions in which the hydraulic clutch for the power takeoff assembly is either on or off. When the lever 42 is in the position as shown in FIG. 4, the detent mechanism 110 including the link 112 which is pivotally mounted on the bracket 72 is shown in the lower end of the slot 114. The bushing on arm 164 formed by the upper end of the link 112 engages the lower end of slot 114. When the lever is rotated in the extreme counterclockwise direction, the arm 164 engages the recess 115 and the spring 113 biases the pin to a retaining position to hold the lever in the operative position whereby the power takeoff clutch is engaged.

The embodiments of the invention in which an exclusive property or privilege is claimed are defined as follows:

1. A multiple lever control console comprising, a plurality of levers, a plurality of spacers alternately spaced between said levers, pivotal support means defining a pivotal axis pivotally supporting said levers and carrying said spacers, a housing carrying said pivotal support means forming an opening radially spaced from said pivotal axis and receiving said levers and said spacers, each of said levers defining an arcuate segment of uniform thickness mounted on said pivotal support means, said arcuate segments of said levers and said spacers axially spaced on said pivotal axis to close said opening in said housing, said housing covering the end portions of said arcuate segments in any position of said levers with said end portion selectively and alternatively rotating inwardly and outwardly of said housing as each of said levers is pivoted, said spacers engaging said arcuate segments adjacent said pivotal axis and radially spaced from said pivotal axis to maintain rotation alignment of said levers, means defining abutting surfaces on said arcuate segments, movement control means mounted on said housing engaging said abutting surfaces for limiting the rotational movement of said levers, connecting means connected to said arcuate segments of said levers for operating lever controlled means.

2. A multiple lever control console as set forth in claim 1 wherein said arcuate segment comprises a portion of relatively thin even-thickness material for sliding engagement with said spacers, a handle integral with each arcuate segment with each handle diverging from the handle on each adjacent lever.

3. A multiple lever control console as set forth in claim 1 wherein said arcuate segment defines an arcuate slot, said abutting surfaces forming ends on said arcuate slot.

4. A multiple lever control console as set forth in claim 1 wherein said arcuate segment defines an arcuate slot, a lateral surface on one side of said arcuate slot defining a recess and a stop position for said lever, a detent element selectively and alternatively engaging said recess, means biasing said detent element into said recess in said slot.

5. A multiple lever control console as set forth in claim 1 wherein each of said spacers define an arcuate peripheral rim, a hub supported on said pivotal support means, spokes interconnecting said rim with said hub for engaging said lever adjacent its pivotal support and radially spaced from said pivotal support.

6. A multiple lever control console as set forth in claim 1 wherein said lever defines an arcuate segment of uniform thickness, said spacers defined bearing surfaces engaging the lateral surfaces of said arcuate segment at a point at its pivotal support and at least two points radially spaced from said pivotal support.

7. A multiple lever control console as set forth in claim 1 including means defining an arcuate slot in said arcuate segment, a pair of friction washers engaging the lateral surface of said lever adjacent said arcuate portion, a support member extending through said arcuate slot for supporting said friction washers and extending to said housing to permit free floating positioning of said frictional washers carried on said lever.

8. A multiple lever control console as set forth in claim 1 wherein said arcuate segment defines an arcuate slot, friction washers engaging said lever, washer support means for supporting said washers and extending through said arcuate slot for providing infinite positioning of said lever as said lever is pivoted.

9. A multiple lever control console as set forth in claim 1 including a cluster of levers positioned for rotation about a first common axis, a second cluster of levers for rotation about a second common axis in spaced relation to said first axis and in parallel relation to said first axis.

10. A multiple lever control console as set forth in claim 1 wherein said arcuate segment defines an arcuate slot, a lateral surface on said arcuate slot forming a recess, a detent element including means biasing said detent element into said lateral surface, means forming one end of said arcuate slot defining a first position for said detent and a first position for said lever, said recess defining the second position of said detent element and the second position for said lever thereby limiting the rotational movement of said lever in each of two directions.

* * * * *